April 15, 1930.   J. H. BENS   1,754,594
SERVING DISH
Filed Aug. 10, 1929
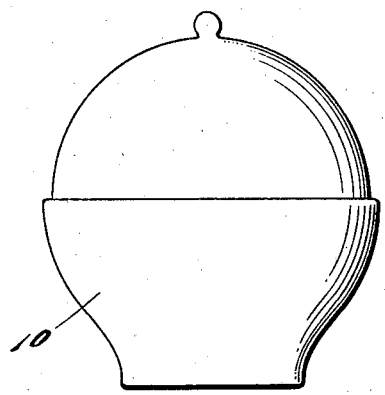
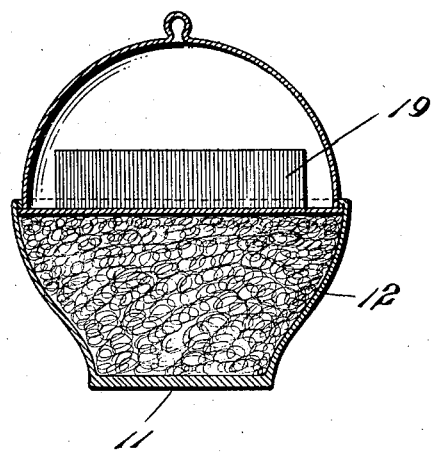
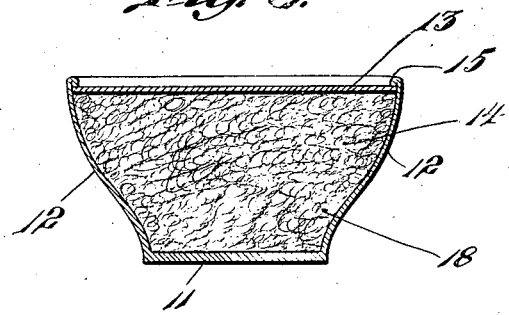
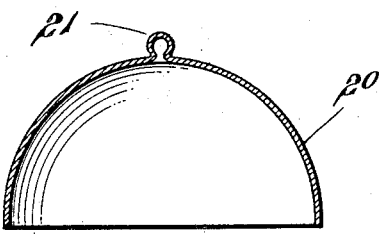
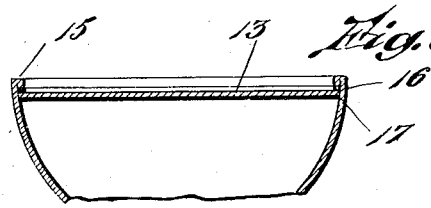
INVENTOR.
John H. Bens
BY Barlow & Barlow
ATTORNEYS.

Patented Apr. 15, 1930

1,754,594

UNITED STATES PATENT OFFICE

JOHN H. BENS, OF NORTH ATTLEBORO, MASSACHUSETTS

SERVING DISH

Application filed August 10, 1929. Serial No. 385,008.

This invention relates to a serving dish; and has for its object to provide a dish which may be easily handled and which will keep food and other articles served thereon in a cold state.

A further object of the invention is to provide a serving dish with the chilling substance which will not be consumed upon use and which may be used over and over again without replenishment of the chilling substance.

A still further object of the invention is the provision of a serving dish of this character which is so constructed that it is very efficient in use and yet is not liable to breakage or injury while the chilling substance is being frozen.

With these and other objects in view, the invention consists of certain novel features of construction, as will be more fully described, and particularly pointed out in the appended claims.

In the accompanying drawings:

Fig. 1 is a side elevation of the improved dish;

Fig. 2 is a section thereof showing an article placed therein for serving;

Fig. 3 is a section of the bottom portion of the dish;

Fig. 4 is a section of the cover; and

Fig. 5 is a fragmental section illustrating a modified arrangement for securing the deck plate in position.

It is found in the serving of foods that it is often desirable to chill or keep certain foods, particularly butter and the like, cold during serving while avoiding the use of ice openly exposed to the air to melt and mingle with the butter or other food; and in order to accomplish these results I have formed a serving dish with a compartment which is sealed to the air and in which some substance which may be chilled and which will slowly absorb heat is confined for this purpose, the compartment being sealed to prevent evaporation or loss of the chilling material and to prevent the entry into the compartment of undesirable or foreign substances. The substance which I preferably use is water, which may be frozen and which will absorb heat in melting and in being raised to room temperature, which assists in maintaining the food upon the dish cooled; but water alone is very likely to crack or bulge the container in freezing, particularly if used in sufficient volume to fill or nearly fill the container, so as to reach to or nearly to the deck plate, which would be necessary for efficient cooling when the dish is in use. Hence I employ in the container a compressible and absorbent substance, preferably a sponge, with sufficient water merely to saturate the sponge. The following is a detailed description of the present embodiment of the invention illustrating the preferred means by which these advantageous results are accomplished:

With reference to the drawings, 10 designates the outer shell of the bottom portion of the dish, which comprises a bottom wall 11 and side wall 12. A deck plate 13 is secured to the side wall 12 at a point spaced from the bottom 11 so as to provide a sealed compartment 14 beneath the plate 13; one manner of securing the deck plate in position is by soldering after rolling over the edge 15 of the side walls 12 to force the plate 13 against the inwardly tapering wall 12; whereas in cases where the material is not suitable for soldering a compressible ring 16 may seal the joint 17 between the plate 13 and the rolled over edge 15; or various other means of forming a fluid and air-tight seal may be used.

The compartment thus formed is filled with some compressible substance 18, such as a sponge or the like, and some material which will absorb cold and heat; for the purpose of illustration the material which I have found most convenient to use, is water, which moistens the sponge, and which is of a volume such that when the dish is placed in a mechanical refrigerator of general use to-day and frozen, there will not be sufficient expansion to break the seal or rupture any of the parts of the dish; there is, of course, some air present which with the sponge allows some compression upon expansion of the solidified water. The sponge also serves to continuously maintain the ice and cold water in contact with the deck plate 13, upon which material 19 such as a block of butter, which is desired to be kept cool, is placed.

My improved sealed container is also useful for refrigerating liquids or the like, the container being chilled and then immersed in the liquid to impart cold thereto without diluting the liquid. The container may also, if desired, be formed cup shape to hold and chill a liquid or the like, if desired.

I have illustrated the material 19 as a block of butter and over the butter I have placed a cover 20 of a dome shaped construction allowing the same to receive the contents on the dish. the same being provided with a handle 21. For convenience the dish which I have illustrated is generally circular in shape but any desired shape may be used.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a container, a sealed compartment comprising the outer wall of the container and containing a refrigerating medium consisting of a compressible and absorbent material moistened with water to be frozen.

2. A dish comprising a shell having a bottom and side walls, a deck plate spaced from the bottom wall and sealed to the side walls to form an air-tight compartment, a spongy substance and water in said compartment of a total volume which will not exceed the volume of the compartment when the water is frozen.

3. A serving dish comprising an outer shell having a bottom and side walls, a deck plate spaced from the bottom wall, means for securing the plate to the side walls to form an air-tight compartment therebelow, said compartment containing a sponge, air and water of a total volume which is containable in said compartment when the water is frozen without cracking or bulging same, whereby articles may be kept cold in said dish when the water is frozen.

4. A serving dish comprising an outer shell having a bottom and side walls, a deck plate spaced from the bottom wall, means for securing the plate to the side walls to form an air-tight compartment therebelow, said compartment containing a sponge, air and water of a total volume which is containable in said compartment when the water is frozen without cracking or bulging same, and a dome-shaped cover for said dish, whereby articles may be kept cold in said dish when the water is frozen.

5. A container having a deck plate, side and bottom walls forming a sealed compartment, a liquid refrigerating medium in said sealed compartment adapted to be frozen, and a compressible and absorbent material in said sealed compartment for maintaining said refrigerating medium in heat-absorbing contact with said deck plate.

6. A dish comprising a shell having a bottom and side walls, a deck plate spaced from the bottom wall and sealed to the side walls to form an air-tight compartment, a compressible and absorbent substance and water in said compartment of a total volume which will not exceed the volume of the compartment when the water is frozen.

In testimony whereof I affix my signature.

JOHN H. BENS.